United States Patent [19]

Avila, Jr.

[11] 3,978,989

[45] Sept. 7, 1976

[54] EXTENSIBLE AND COLLAPSIBLE PORTABLE DERRICK

[76] Inventor: Fred Avila, Jr., 27318 Tyrrell Ave., No. C-6, Hayward, Calif. 94544

[22] Filed: Feb. 7, 1975

[21] Appl. No.: 548,086

[52] U.S. Cl. .................................. 212/1; 214/75 H; 212/28; 212/55; 187/2

[51] Int. Cl.[2] ...................... B60P 1/46; B66P 23/00; B66C 23/62

[58] Field of Search ...................... 212/1, 28, 40–41, 212/54–55, 58 R–59 R, 144; 214/75 H; 187/2

[56] References Cited

UNITED STATES PATENTS

| | | | |
|---|---|---|---|
| 380,206 | 3/1888 | Kane | 212/55 |
| 733,469 | 7/1903 | Dunbrook et al. | 212/41 |
| 935,413 | 9/1909 | Ryan et al. | 212/28 |
| 1,345,008 | 6/1920 | Hill | 212/55 |
| 2,292,353 | 8/1942 | Ennis et al. | 214/75 H |
| 2,516,364 | 7/1950 | Caddell | 212/55 X |
| 2,661,854 | 12/1953 | Adams | 214/75 H |
| 2,804,216 | 8/1957 | Farnam | 214/75 H |
| 2,896,908 | 7/1959 | Stone | 212/55 X |
| 3,845,869 | 11/1974 | Sowers et al. | 214/75 H |
| 3,854,594 | 12/1974 | Brooks | 214/75 H |

FOREIGN PATENTS OR APPLICATIONS

| | | | |
|---|---|---|---|
| 248,388 | 1/1961 | Australia | 214/75 H |
| 79,596 | 1/1952 | Norway | 212/28 |
| 657,326 | 9/1951 | United Kingdom | 214/75 H |

*Primary Examiner*—Robert J. Spar
*Assistant Examiner*—R. B. Johnson
*Attorney, Agent, or Firm*—William R. Piper

[57] ABSTRACT

An extensible and collapsible portable derrick in which the various parts are made from a light weight metal and in which the parts can be disassembled and arranged in compact units, light enough in weight and small enough in size to be readily transportable by a person. The device is primarily designed to be used by operators who use tar paper and gravel for covering flat roofs of buildings whether or not the roofs are provided with parapets.

1 Claim, 4 Drawing Figures

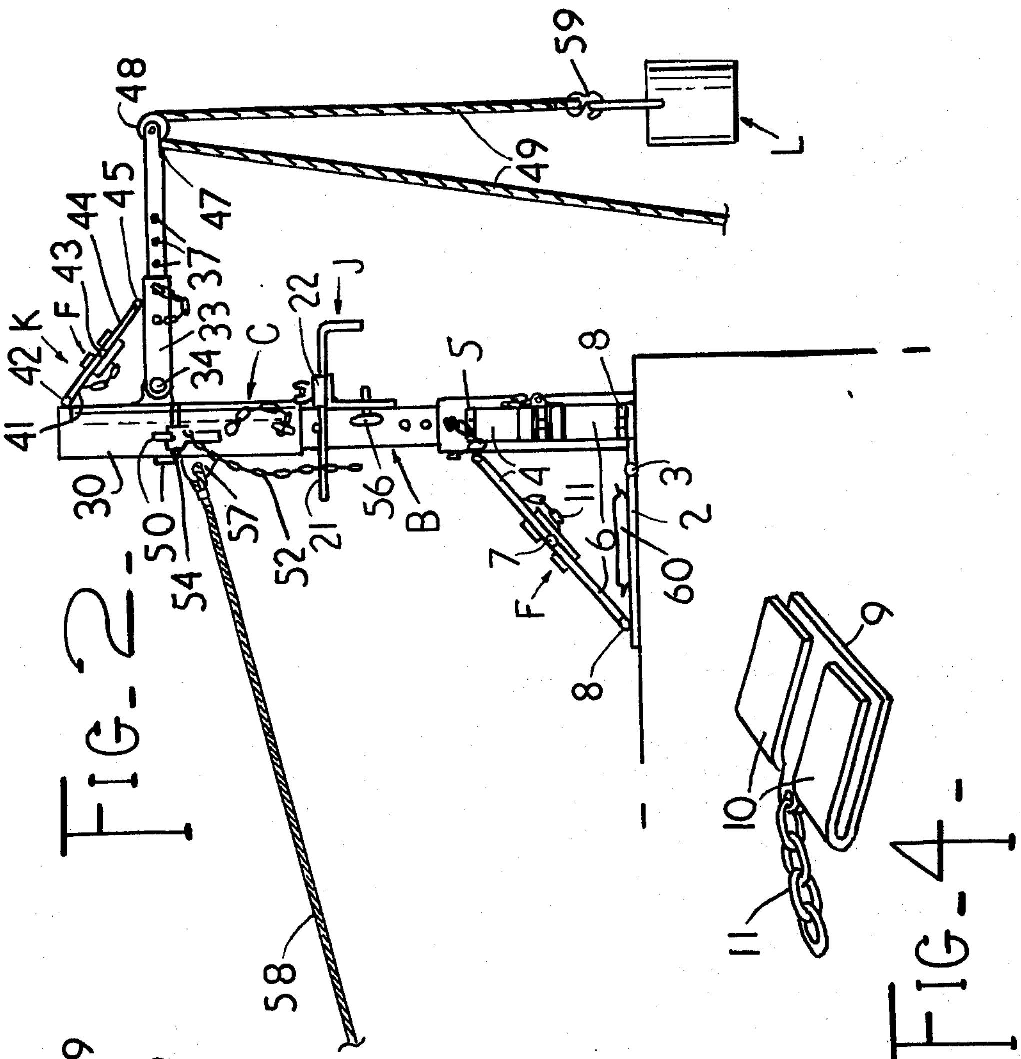
FIG. 2
FIG. 4
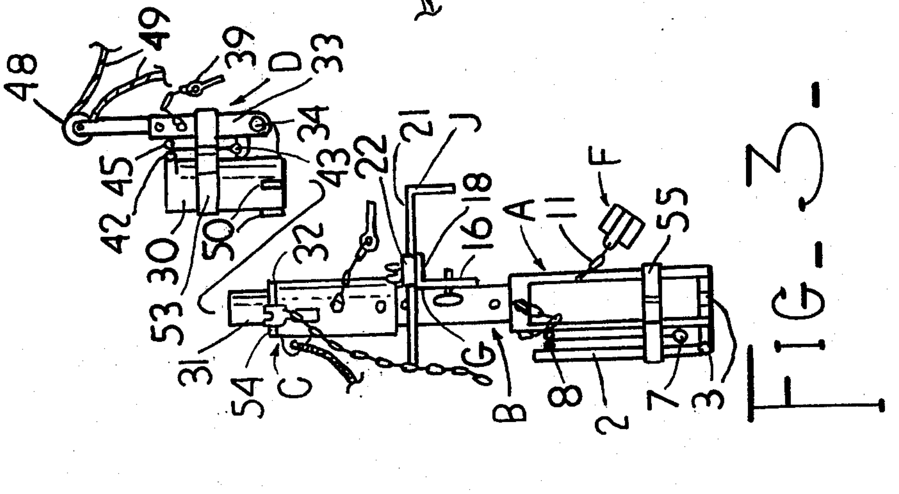
FIG. 3

EXTENSIBLE AND COLLAPSIBLE PORTABLE DERRICK

SUMMARY OF THE INVENTION

An object of my invention is to provide an extensible and collapsible derrick which is primarily designed to be used by construction trades that require hoisting material and equipment to the roof or any other parts of a building as it is being constructed. The device is ideally suited for patch crews in roofing. The derrick can be disassembled into compact units that can be carried by the operators to the roof and there assembled on the job. The units can be assembled without the need of tools to form the derrick which may be supported by the flat roof if there is no parapet or it may be supported by the parapet if the building has one. The units are telescopically interconnected when assembled and they may be adjusted as to height so as to position a swingable derrick arm the desired distance above the flat roof or parapet.

BRIEF DESCRIPTION OF THE DRAWINGS

FIG. 2 is a side elevation of the derrick when mounted on a flat roof that does not have a parapet.

FIG. 3 shows the derrick parts disassembled and collapsed into separate units that are light enough in weight so that each unit can be carried by a person.

FIG. 4 is an enlarged isometric view of the type of clip used for holding jointed members in extended or operative position.

DESCRIPTION OF THE PREFERRED EMBODIMENT

Figure 1:
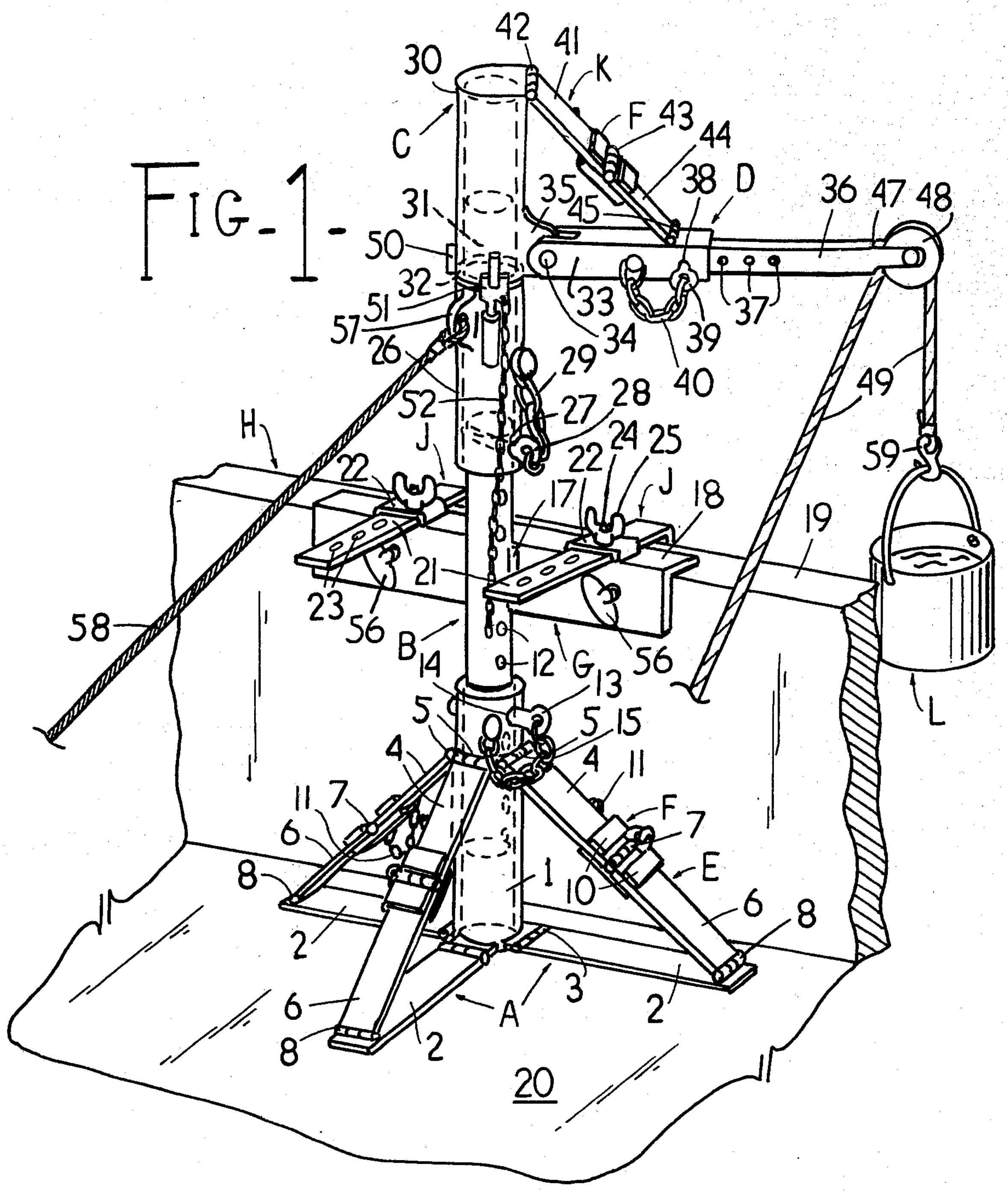
FIG. 1 is an isometric view of the derrick when mounted on a roof parapet.

In carrying out my invention, I provide an extensible and collapsible derrick that has a base, indicated generally at A in FIG. 1, an intermediate unit B and a top C, with a swingable arm D. The base A has a central, upstanding cylindrical member 1 which could be square or rectangular in cross section if desired. Swingable base members 2 are hinged to the bottom of the central member 1 at 3. Two of these base members 2, when swung into operative position, will be arranged in alignment with each other and the third base member will extend at right angles to the other two.

I show three hinged braces E for holding the three swingable base members 2 in extended or operative position. Each hinged brace E consists of an inner member 4 hinged at 5 to the central member 1, and of an outer member 6 hinged at its inner end to the outer end of the member 4 at 7 and hinged at 8 to the outer end of the base member 2. I use clips of the type shown in FIG. 4 and designated as F in FIGS. 1-3 for holding the arms 4 and 6 in extended or operative position. Any type of spring clip F may be used and I have shown the clip with one side 9 and a bifurcated side with two prongs 10 that straddle the hinge 7 when the clip is applied to the hinged brace E for holding the arms 4 and 6 in operative position. Chains 11 secure the clips F to the braces E so as to prevent the clips from being misplaced when not in use.

The base A adjustably supports an intermediate cylindrical member B. This member has a plurality of openings 12 arranged along two longitudinal and diametrically opposed rows on the member. A pin 13, see FIG. 1, can be inserted through diametrically opposed openings 14 in the central base member 1 and through any desired pair of registering openings 12 in the intermediate member B. In this way the member B is adjustably connected to the central base member 1. A chain 15 connects the pin 13 to the central member 1 so that it cannot become lost.

FIGS. 1, 2 and 3 illustrate a bracket G, angle-shaped in cross section and having one side 16 welded at 17 to the intermediate member B so that the member is centrally disposed between the ends of the bracket. The bracket G has a top 18 that is designed to rest on the top 19 of a parapet H rising above a flat roof 20 of a building. The purpose of this will be explained more fully when describing the operation of the device. A pair of hooks J have their shanks 21 slidably adjustable in sleeves 22 that are integral with the top 18 of the bracket G. The shanks 21 have a row of openings 23, see FIG. 1, and bolts 24 are designed to be passed through aligned openings in the bracket top 18, the sleeve 22 and a desired opening in the row of openings 23 for adjusting the shank in the correct position with respect to the bracket so that the hook J will engage with the outer wall of the parapet and the side 16 of the bracket will engage with the inner wall. Wing nuts 25 are mounted on the bolts 24 and secure the shanks 21 of the hooks J from accidentally slipping in the sleeves 22.

The top C of the derrick includes a cylindrical member 26, see FIG. 1, that is designed to telescope over the upper end of the cylindrical intermediate member B. The member 26 has diammetrically opposed openings 27 adapted to be aligned with any pair of diammetrically opposed openings 12 in the member B so that a pin 28 may be inserted through the aligned openings for securing the member 26 to the member B in adjusted position. A chain 29 connects the pin 28 to the member 26 to prevent loss when the pin is not used.

A rotatable cap 30 is cylindrical in shape and is rotatably mounted on the top of the member 26. The upper end of the member 26 has a portion 31 of a reduced diameter that is the same as the inner diameter of the cap 30 so that the portion 31 acts as a bearing around which the cap 30 can rotate. An annular shoulder 32 is formed at the juncture of the reduced portion 31 with the enlarged diameter of the member 26 and this shoulder supports the cap while permitting it to rotate with respect to the member B.

The extensible derrick arm D has an inner member 33 that is pivoted at 34 to a lug 35 which is integral with the cap 30, see FIG. 1. The outer end of the member 33 is made hollow and is non-circular in cross section. This hollow outer end of the member 33 adjustably receives an extensible member 36 having the same cross sectional configuration as that of the hollow portion of the member 33 so as to prevent any rotation of the member 36 about its longitudinal axis. The extensible member 36 has a row of openings 37, any one of which can be brought into registration with an opening 38 formed in the hollow end of the member 33. A pin 39 can be inserted in aligned openings 37 in the member 36 and opening 38 in the member 33. The pin secures the member 36 in adjusted position with respect to the member 33. A chain 40 secures the pin 38 to the member 33 to prevent loss.

The extensible arm D is braced when in extended position by a jointed brace K, see FIGS. 1 and 2. The brace K has an inner member 41 secured to the top of the cap 30 by a hinge 42. The inner member 41 is hinged at 43 to an outer member 44, which in turn is secured to the member 33 by a hinge 45. A clip F straddles the hinge 43 and engages with the members 41 and 44 for holding them in operative position. A chain 46, see FIGS. 2 and 3, connects the clip F to the member 41 to prevent its loss when the clip is not being used. At the outer end of the arm member 36, a clevis 47 is carried and a pulley 48 is rotatably mounted in the clevis. Both FIGS. 1 and 2 show a cable 49 passed around the pulley and supporting a pail L or any other item that is to be lifted onto the roof.

Referring again to FIG. 1, it will be seen that the rotatable cap 30 has a plurality of integral projections 50 at its lower end and extending radially from the outer surface of the cap. A yoke-shaped plunger 51 is carried by the member 26 and is spring biased so as to yieldingly engage with any one of the desired lugs 50 for holding the cap 30 from accidental rotation. A cord 52 is attached to the plunger 51 and may be manually pulled for freeing the plunger from the projection 50, whereby the cap and arm D can be rotated into any desired position to extend over the parapet H, as shown in FIG. 1, or to be swung back over the roof 20.

The top unit C is shown removed from the other units A and B, in FIG. 3, and the hinged brace K has been folded downwardly into inoperative position, while the arm D has been swung upwardly into a substantially parallel position with the longitudinal axis of the cap 30. A strap 53 may be used to encircle the cap and arm for securing them in folded position. The annular shoulder 32 on the cylindrical member B may have a roller bearing 54 mounted thereon and encircling the reduced portion 31. This roller bearing would carry the weight of the unit C, plus the extra weight of the pail L or other item connected to the cable 49. I have already explained how the intermediate unit can be separated from the base unit A. The base unit, when collapsed as in FIG. 3 to take up less space, may have a strap 55 encircle the folded parts for holding them in their folded arrangement.

OPERATION

From the foregoing description of the various parts of the device, the operation thereof may be readily understood. FIG. 3 shows the device separated into two units. The top unit C is shown in collapsed condition and it can be readily carried by one person. The intermediate unit B could be separated from the base unit A, and a person could carry the separate unit B by placing the hooks J over his shoulders and thus support the unit on his back. The base unit A can be removed from the intermediate unit B and thus be carried separately in its collapsed condition.

The three units A, B and C are small and light enough in weight so as to be readily carried. The operators can carry the units up a step ladder, not shown, to the roof 20 of the building or, if the building has an elevator, the units are small enough that they can be carried into the elevator. FIG. 1 shows a building with a parpapet H surrounding the roof 20. The two units A and C are opened up by first removing the strap 55 enclosing the unit A and by removing the strap 53 enclosing the unit C. The hinged base members 2 may be swung into open position, although this need not be done if the device is to be supported by the parapet H. The lower end of the cylindrical intermediate part B is telescoped within the central cylindrical member 1 and is lowered to the desired extent and then the pin 13 is inserted in registering openings 14 and 12. The hooks J are adjusted in the sleeves 22 and secured in place by the bolts 24 and wing nuts 25. The hooks J and the bracket G are placed on top of the parapet H so that the bracket will have its top 18 resting on the top of the parapet and the side 16 of the bracket will contact the inner wall of the parapet. The hooks J will have their outer ends engage with the outer surface of the parapet. The intermediate unit B may be clamped in position on the parapet by the operator tightening hand screws 56, see FIG. 1, in the side 16 of the bracket G for forcing the inner ends of the screws against the inner surface of the parapet. This will move the hooks J against the outer surface of the parapet and thus grip the parapet for supporting the intermediate unit B.

The top unit C has its arm D swung into operative position and the cap 30, see FIG. 1, is placed over the reduced cylindrical portion 31 of the member 26. The member 26 in turn has its lower end telescoped over the intermediate member B and held in place by the pin 28, which is inserted into aligned openings 27 and 12. The cap 30 rests on the ball race 54, see FIG. 3, and is free to rotate through a complete circle of 360°. However, the cap 30 has outwardly projecting lugs 50 and the member 26 has the spring biased plunger 51 for engaging with a desired lug 50 for holding the cap 30 from rotating.

In actual practice, the part 26 has an integral eye 57, see FIG. 1, to which a tie back cable 58 is secured and the other end of the cable may be secured to any object, not shown, on the roof 20, such as a pipe, etc. One of the lugs 50 is so positioned on the cap 30, that when the arm D projects from the cap so as to be approximately at right angles to the outer surface of the parapet, this lug will be in registration with the yoke-shaped plunger 51 and when engaged by the plunger, will prevent the arm D from swinging in a lateral direction. The base A may have its hinged base members 2 restiang on the roof 20 or they may be folded into their upright position if desired.

The cable 49 is manually controlled, although it may be connected to a winch, not shown, for raising and lowering the pail L or any other item connected to the hook 59 placed at the end of the cable. The pail L may be lowered to the ground and filled with liquid tar or any other item, and then the cable 49 can be pulled for lifting the pail to a point higher than the top of the parapet, whereupon the cord 52 may be pulled for releasing the plunger 51 from the projection 50 and permit the arm D to be swung so as to move the pail L over the parapet H and onto the roof 20. This operation is repeated as often as is necessary for lifting different items onto the roof 20 during the repairing of the roof or in applying a new covering for the roof. At the end of the operation, the units A, B and C are disassembled and compacted and then carried down from the roof as three individual units.

In FIG. 2, I show the device mounted on a flat roof 20 that is not provided with a parapet. The units A, B and C are assembled in the same manner as that already described for FIG. 1 and there is no need for repeating it. The hinged base members 2 now rest on the roof 20 and support the device rather than the hooks J, and the bracket G. Sand bags 60 may be placed on top of the base members 2 for giving the desired weight for holding the derrick in position. The tie wire 58 or cable may be tied to any fixture, not shown, on the roof 20 for preventing the derrick from tilting. The device is used in the same manner as already explained. The derrick may be shifted to new positions on the roof 20 in FIG. 2 and also in FIG. 1, as required. The derrick in FIG. 2 may be dismantled at the end of its operation in a manner already explained and the units A, B and C may be carried back to the ground.

The derrick can be assembled on staging or window ledge or anything that the derrick hooks can engage or when the tie-back can be attached to a hoist mast.

I claim:

1. A portable derrick comprising:

a. a base including a hollow upright with hinged base members swingable outwardly into a plane that extends at right angles to the axis of said upright;

b. hinged braces interconnecting the outer ends of said base members with said upright and each consisting of two parts hinged together with removable clips holding said two parts in lineal alignment with each other when said base is in operative position;

c. an intermediate unit having an extension removably and slidably receivable in said upright with means for securing said intermediate extension in said upright in adjusted position;

d. a transversely extending bracket, angle-shaped in cross section and having the midpoint of its front face permanently secured to the extension of said intermediate unit, the top of said bracket lying in a plane which extends at right angles to the axis of said extension;

e. a hook disposed on each side of said extension and being adjustably received in sleeves secured to the top of said bracket, the outer ends of said hooks extending downwardly and cooperating with the front face of said bracket to form shoulder engaging members when said intermediate unit is freed from the hollow upright of said base when it is desired to carry the intermediate unit independently of said base;

f. means carried by said sleeves for securing said hooks in adjusted position therein for permitting said hooks to contact with one side of a building parapet and the front face of said bracket being disposed adjacent to the other side of the parapet, and hand screws on the front face for clamping the bracket to the parapet;

g. a top unit having a cap removably and rotatably mounted on the top of the extension for said intermediate unit;

h. an extensible arm pivotally secured to said cap and being swingable from a closed position, where the length of the arm parallels the axis of said cap, into an operative position where said arm projects radially from said cap, and a pulley mounted at the outer end of said arm; and i. a hinged brace for supporting said arm in operative position, said cap and arm being rotatable around said extension.

* * * * *